United States Patent [19]

Othmer et al.

[11] Patent Number: 5,775,996
[45] Date of Patent: Jul. 7, 1998

[54] METHOD AND APPARATUS FOR SYNCHRONIZING THE EXECUTION OF MULTIPLE VIDEO GAME SYSTEMS IN A NETWORKED ENVIRONMENT

[75] Inventors: Konstantin Othmer, San Jose; Shannon A. Holland; Stephen G. Perlman, both of Mountain View; Steven G. Roskowski, San Jose, all of Calif.

[73] Assignee: MPath Interactive, Inc., Mountain View, Calif.

[21] Appl. No.: 704,930

[22] Filed: Aug. 28, 1996

Related U.S. Application Data

[63] Continuation of Ser. No. 340,032, Nov. 14, 1994, abandoned.

[51] Int. Cl.[6] .................................................. A63F 9/22
[52] U.S. Cl. ............................................................ 463/40
[58] Field of Search ........................ 463/40, 41, 42; 273/148 B; 348/13–20; 455/66

[56] References Cited

U.S. PATENT DOCUMENTS

| | | |
|---|---|---|
| 4,520,477 | 5/1985 | Wen . |
| 4,570,930 | 2/1986 | Matheson ................. 273/DIG. 28 |
| 4,572,509 | 2/1986 | Sitrick . |
| 4,592,546 | 6/1986 | Fascenda et al. . |
| 4,799,635 | 1/1989 | Nakagawa . |
| 4,980,897 | 12/1990 | Decker et al. . |
| 4,998,199 | 3/1991 | Tashiro et al. . |
| 5,013,038 | 5/1991 | Luxenberg et al. . |
| 5,048,831 | 9/1991 | Sides . |
| 5,070,479 | 12/1991 | Nakagawa . |
| 5,083,800 | 1/1992 | Lockton . |
| 5,112,051 | 5/1992 | Darling et al. . |
| 5,120,076 | 6/1992 | Luxenberg et al. . |
| 5,155,768 | 10/1992 | Matsuhara . |
| 5,161,803 | 11/1992 | Ohara . |
| 5,291,189 | 3/1994 | Otake et al. . |
| 5,292,125 | 3/1994 | Hochstein et al. . |
| 5,350,176 | 9/1994 | Hochstein et al. . |
| 5,453,780 | 9/1995 | Chen et al. ................................ 348/15 |
| 5,538,255 | 7/1996 | Barker . |

FOREIGN PATENT DOCUMENTS

| | | |
|---|---|---|
| 402067 | 6/1990 | European Pat. Off. . |
| 481770 | 10/1991 | European Pat. Off. . |
| 571138 | 5/1993 | European Pat. Off. . |
| 571213 | 5/1993 | European Pat. Off. . |
| 9323125 | 11/1993 | United Kingdom . |

*Primary Examiner*—Jessica Harrison
*Assistant Examiner*—Michael O'Neill
*Attorney, Agent, or Firm*—Wagner, Murabito & Hao

[57] ABSTRACT

The present invention is a means and method for synchronizing the execution of multiple video game systems in a networked environment with no external synchronization signals required. Video games and most computer display controllers are closed free-running systems. Because most such systems have the means to switch between an interlaced and non-interlaced operation, and because interlaced and non-interlaced modes have a relative timing variation, the timing between two or more such closed free-running systems can be synchronized. This method allows synchronization with an imprecise timing reference. The vertical display timing is the free-running oscillator and the interlaced/non-interlaced mode transition is used as the timing adjustment means. The actual arrival time of data in a communication medium connecting two systems being synchronized is used in relation to an expected arrival time to provide the clock reference.

8 Claims, 15 Drawing Sheets

IF SYNCLOCK WERE SENT AT UBI

METHOD AND APPARATUS FOR SYNCHRONIZING THE EXECUTION OF MULTIPLE VIDEO GAME SYSTEMS IN A NETWORKED ENVIRONMENT

This is a continuation of application Ser. No. 08/340,032, field Nov. 14, 1994, now abandoned.

FIELD OF THE INVENTION

The present invention relates to the field of video game systems. Specifically, the present invention pertains to synchronization the execution of multiple video game systems in a networked environment.

REFERENCE TO RELATED PATENT APPLICATIONS

The following co-pending patent applications are related:

U.S. Patent Application entitled, "AN IMPROVED NETWORK ARCHITECTURE TO SUPPORT REAL-TIME VIDEO GAMES", invented by Steve Perlman, with Ser. No. 08/236,630 and filed on May 5, 1994 now abandoned.

U.S. Patent Application entitled, "NETWORK ARCHITECTURE TO SUPPORT MULTIPLE SITE REAL-TIME VIDEO GAMES", invented by Steve Perlman, with Ser. No. 08/238,477 and filed on May 5, 1994 now issued as U.S. Pat. No. 5,586,257.

U.S. Patent Application entitled, "MODEM TO SUPPORT MULTIPLE SITE CALL CONFERENCED DATA COMMUNICATIONS", invented by Steve Perlman, with Ser. No. 08/238,456 and filed on May 5, 1994 now issued as U.S. Pat. No. 5,636,209.

U.S. Patent Application entitled, "NETWORK ARCHITECTURE TO SUPPORT RECORDING AND PLAYBACK OF REAL-TIME VIDEO GAMES", invented by Steve Perlman, with Ser. No. 08/238,303 and filed on May 5, 1994 now issued as U.S. Pat. No. 5,558,339.

U.S. Patent Application entitled, "METHOD AND APPARATUS FOR LOOSELY SYNCHRONIZING CLOSED FREE-RUNNING RASTER DISPLAYS", invented by Steve Perlman and Steve Roskowski, with Ser. No. 08/334,676 and filed on Nov. 4, 1994 now abandoned.

DESCRIPTION OF RELATED ART

Video games that are played at disparate locations across communication channels are well-known in the prior art. From personal computer games such as SPECTRE VR, distributed by VELOCITY™, communicating through modems, serial cables, and networks, to workstation games such as NET TREK communicating through the Internet, to home video games such as NBA™ JAM™ distributed by Acclaim Entertainment, Inc. communicating through modems, there is a broad variety of games that provide a common gaming environment to two or more players physically located at different sites.

There is a wide variance among prior art games as to the degree (or "tightness") of synchronization between (or among) the respective computers playing a communicating game. At one extreme are games such as NET TREK which due to the unpredictable and high-latency nature of the Internet, can accommodate seconds of latency between one computer playing NET TREK and another. At the other extreme are so-called "twitch" games such as NBA JAM which are highly interactive and unacceptable to play with more than a 100 millisecond (msec) round-trip latency (for a symmetric communications channel, 50 msec one-way latency) between two video game machines. Given that the latency of an electrical or optical signal across a great distance (e.g. from San Francisco to New York is approximately 35 msec one-way) approaches or even exceeds the acceptable latency for a twitch video game. (due to impairments to the speed of light through copper or optical fiber), clearly it is desirable to minimize other latencies in the communication path in the system.

One prior art approach to minimizing latency in the communications path has been to minimize the latency in a modem used by the video game systems to communicate over a phone line. Atari, Inc. has announced a modem designed by Phylon Communications for use with the Jaguar™ video game that purports to have a 12 msec latency one-way as an improvement over other modems with 20 msec latencies or more.

Such an 8 msec improvement is quite relevant in improving the user experience.

In addition to channel and modem latency (in the case of a telephone line communications channel) there is latency incurred due to the fact that the video game system at each end of the communications path is a free running system and there is synchronization uncertainty. Typically, the internal game loop (i.e. the software loop that advances successive animation states of the game) runs with some synchronization to video vertical retrace (which the software locks to through either a vertical blanking interrupt (VBI) or by sampling a vertical blanking flag). This synchronization is very common in games because VBI provides a convenient time to update the graphics image for performance reasons and to avoid visual impairments. Since the VBIs of two or more free-running systems (even with a crystal-based time reference, any two free-running systems will drift in time relative to each other) across a communications channel are asynchronous to one another, latency allowance must be made to accommodate the worst-case uncertainty among the various free-running systems. For example, if it were the case that the systems are synchronous to one another, the VBI of one system is known to be in phase with that of every other system, and data that arrives synchronously just in time for VBI can be used immediately. But since the systems are free-running, sooner or later (a) one of the systems will drift so far from the other that it will get an entire frame ahead and (b) the VBIs will be at some point 50% out of phase with each other. To accommodate such uncertainty ½ frame of extra latency must be provided for. In the case of NTSC, this adds 8.4 msec of extra latency. In the case of PAL/SECAM, this adds 10 msec of extra latency. Particularly in the case of long distance communication such added latency can make a significant difference in the quality of twitch gameplay.

Note that the inherent "resynchronization overhead" of communicating data among asynchronous systems is a well-known phenomenon of communications theory. Added latency of 50% of the systems' free-running clock period (in this case the video vertical period of ⅟₆₀ Hz (16.67 msec) or ⅟₅₀ Hz (20 msec)) is the theoretical overhead and it is the result typical in practice.

Although it is possible to design special-purpose video games that can synchronize their vertical timing over a communications channel in order to eliminate the aforementioned added latency, using prior art video synchronization techniques (such as genlock) the clock accuracy would have to be on the order of one part per 10 million. This would be prohibitively expensive over long distances. Further, such a special-purpose system would be incompatible with the huge installed base of video game machines (such as the Sega Genesis from SEGA™ and Super Nintendo Entertainment System from NINTENDO™) and personal computers (such as the Apple Macintosh and IBM PC) which with few exceptions are closed free-running video systems as well as existing software. Thus, there are no examples in the prior art of low-cost, mass-market video games that communicate across long distance communications channels with their internal gameloops synchronous to both their internal VBI and to the gameloops of other systems across the communications path. And consequently, prior art video game systems that have their gameloops synchronous to VBI incur at least an additional ½ frame of additional latency, a significant factor in reducing the quality of gameplay.

Thus, a better means and method for synchronizing the execution of multiple video game systems in a networked environment is needed.

SUMMARY OF THE INVENTION

The present invention is a means and method for synchronizing the execution of multiple video game systems in a networked environment with no external synchronization signals required. Video game systems and most computer display controllers are closed free-running systems. Because the displays of most such systems have the means to switch between an interlaced and non-interlaced mode of operation, and because interlaced and non-interlaced modes have a relative timing variation, the timing between the displays of two or more such closed free-running systems can be synchronized. This method allows synchronization with an imprecise timing reference. The present invention is specifically applicable to maintaining frame synchronization between two video games or computer systems with similar display frequencies and a means to alternate video display modes, which are connected via a modem link.

The present invention defines a protocol for synchronizing the execution of multiple video game systems connected over a network. This protocol assures that each system remains in frame synchronization with other systems. The player controller inputs are always directed to the correct game loop on each system. The invention is capable of handling a loss of network communication and re-establishing execution synchronization.

The present invention) works with most of the installed base of home video game systems (e.g. Sega Genesis from SEGA™ and Super Nintendo Entertainment Systems from NINTENDO™), and personal computers (such as the Apple Macintosh and IBM PC using displays for common refresh rates) and saves one-half frame time of added latency, a significant factor in reducing the quality of gameplay. Additionally, by guaranteeing that all game machines connected through the communications path have the same number of VBIs per game (e.g. no machine ever gets a frame ahead of another), it substantially simplifies the design of the communications software. This eliminates many of the complexities of multi-player networked game design allowing the designer to focus on the issues of multi-player game design as if it were a locally running system. Also, the present invention can be implemented in hardware, software, or in a combination thereof at relatively low cost. In particular, the processing requirements for the software is small enough that such processing can be easily accomplished by the modest processors found in low-cost video game machines without substantially impacting the quality of gameplay.

DETAILED DESCRIPTION OF THE PREFERRED EMBODIMENT

The present invention is a means and method for synchronizing the execution of multiple video game systems in a networked environment with no external synchronization signals required. In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

The preferred embodiment of the present invention operates in the context of a networked video game system. In a networked video game system, a first video game system is coupled to a second video game system via a communication medium. Such a configuration is illustrated in FIG. 1.

Figure 1:
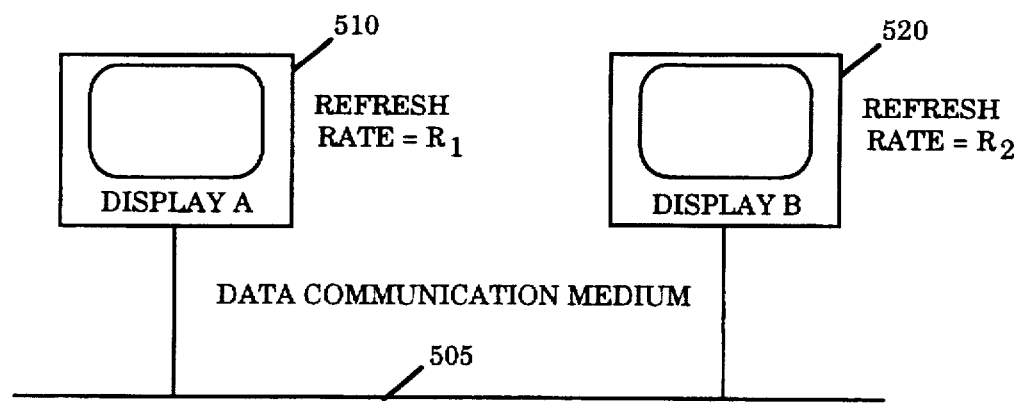
FIG. 1 illustrates a typical networked video game system architecture having a plurality of raster display devices coupled to a data communication medium.

Referring now to FIG. 1, a simplified diagram illustrates two video game systems 510 and 520 connected via a communication medium 505. For purposes of the following description, game system 510 is denoted the master and game system 520 is denoted the slave. It will be apparent to those of ordinary skill in the art that the designation of a particular system as master or slave is purely arbitrary.

In the preferred embodiment, the communication medium 505 is the standard telephone network and the first and second video game systems are direct connected via a direct telephone call initiated by one of the video game systems. The details of establishing this interconnection of video game systems via the telephone network is described in detail in the above-referenced co-pending patent applications. The video game system initiating the telephone call is denoted the master system. The video game system receiving the telephone call is denoted the slave system. Except in some circumstances, it makes no difference which video game system initiates the telephone call and becomes master.

A design goal of networked video games is to minimize the latency between activation of a controller and seeing the desired action of the TV screen. This latency is determined by the communication channel latency plus the timing uncertainty between the two systems plus the communication channel latency uncertainty. The timing uncertainty is the maximum possible skew between the two systems. Since the timing reference is VBIs, the maximum skew is half of a VBI or half of a frame time. For NTSC at 16.67 msec/ frame, this is 8.3 msec of added latency. For PAL at 20 msec/frame, this is 10 msec. Since the goal is to achieve less than two frame times of latency for ideal reaction time, half of a frame of added latency is significant.

A principal advantage of the present invention is that by synchronizing the video displays between the two networked video games, data can be exchanged between the two systems in real-time with a minimum latency. This is true because game loop execution usually proceeds with some synchronous relationship to vertical blanking, and thus if vertical blanking is synchronized, the game loops, at some level can be synchronized also. Synchronous systems can communicate with minimum latency because there is no uncertainty as to when data will arrive.

The presently preferred embodiment includes a timestamping means to time-stamp data arriving relative to a vertical refresh event. The present invention also includes a protocol for performing the following three basic functions: 1) establishing synchronization between game system 510 and game system 520 using messages passed over communication medium 505, 2) maintaining synchronization between game system 510 and game system 520, and 3) re-establishing synchronization between game system 510 and game system 520 if synchronization is lost. These three basic functions of the protocol of the present invention in the context of a networked video game system are described in detail below.

Establishing Synchronization

Figure 2:
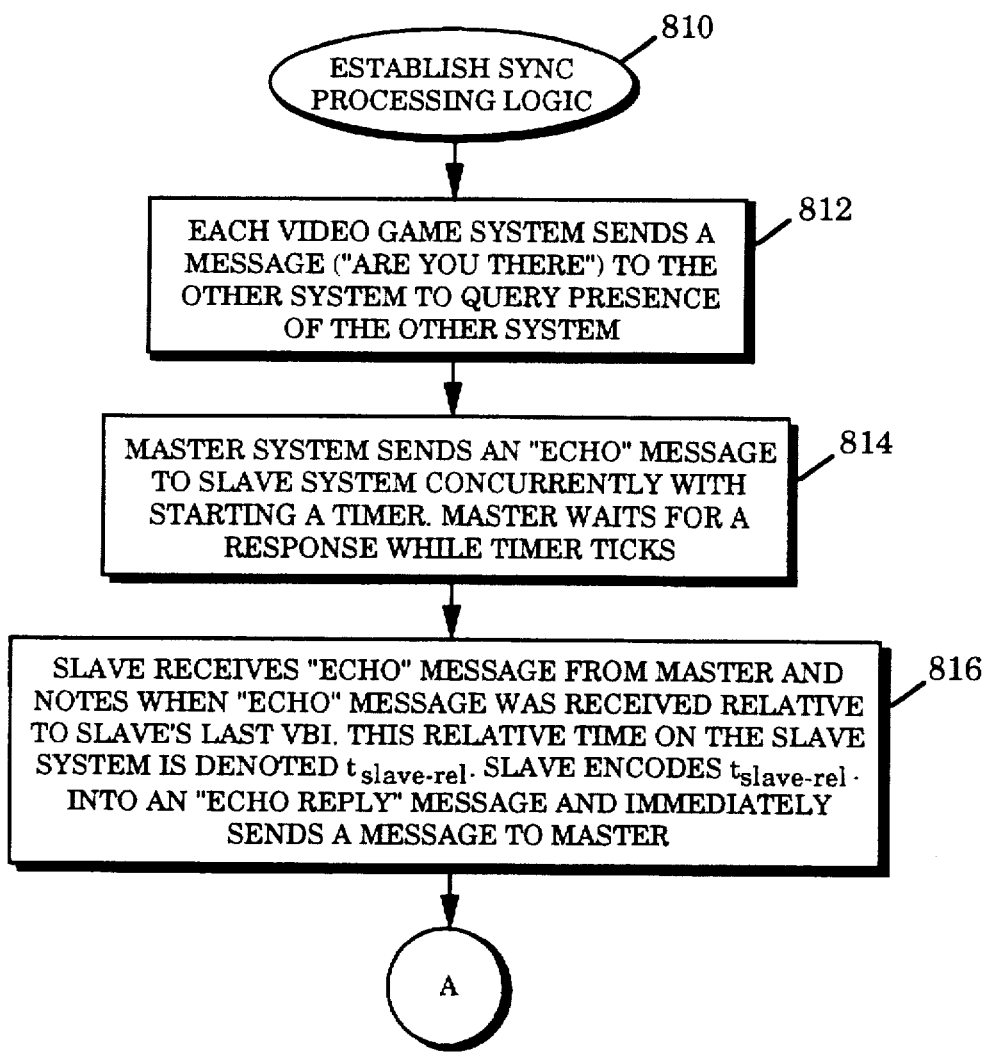
FIGS. 2–4 are flowcharts illustrating the processing logic of the present invention for establishing synchronization.

Referring now to FIG. 2, a flow chart illustrates the processing logic performed by the present invention for establishing synchronization between two game systems in a networked video game system. In the preferred embodiment, two video game systems such as those described above execute software or firmware which performs the processing steps described below. These video game systems are coupled together on a communication medium such as a telephone network. The processing performed by the preferred embodiment for establishing synchronization between the two video game systems starts in processing block 812. Each video game system sends a message to the other video game system to query the presence of the other system on the network. Clearly, if no such message is received from another system, the synchronization processing logic terminates without having achieved synchronization. If however each video game system receives the initial query message from the other system, processing continues at processing block 814. One system is arbitrarily assigned the master system while the other system is assigned as the slave system. Typically, the video game system designated as master is the system who initiates a telephone call in the presently preferred embodiment to the system designated as the slave system. It will be apparent to those of ordinary skill in the art however that either system may act as a master while the other system acts as a slave. The master system sends an "Echo" message to the slave system concurrently with starting a timer in the master system (processing block 814). The "Echo" message sent by the master is intended to test the latency in the communication path between the master and slave systems. The master sends the "Echo" message to the slave and waits for a response from the slave while the timer ticks down. In processing block 816, the slave system receives the "Echo" message from the master system and notes when the "Echo" message was received relative to the slave systems last vertical blanking interrupt (VBI). This relative time on the slave system, denoted $t_{slave-rel}$, provides a time reference between the transmission of the echo message from the master and the refreshing of frames in the slave system. The slave encodes $t_{slave-rel}$ into an "Echo Reply" message and immediately sends the message to the master (processing block 816). Processing for establishing synchronization between video game systems then continues at the bubble labeled A illustrated in FIG. 3.

Figure 3:
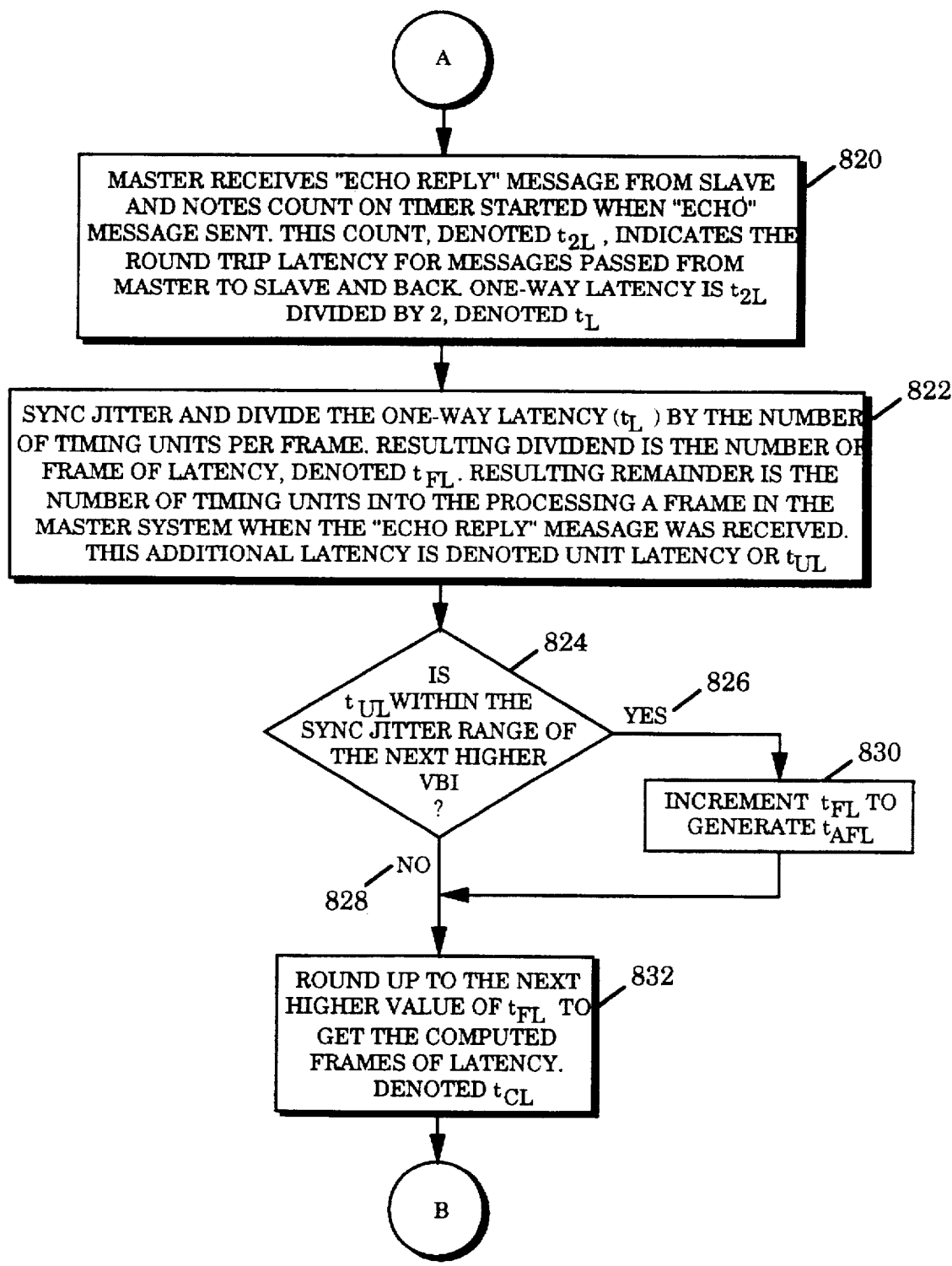

Referring now to FIG. 3, processing logic for establishing synchronization continues at the bubble labeled A. The master receives the "Echo Reply" message from the slave and notes the count on the timer started when the "Echo" message was sent. This count, denoted $t_{2L}$, indicates the round trip latency for messages passed from the master system to the slave system and back to master system. In the preferred embodiment, the one way latency is computed by dividing the round trip latency ($t_{2L}$) by two. This one way latency is denoted $t_L$. Note that the communication channel between the master and slave systems need not be latency symmetric in both directions. The round trip latency can still be used to effectively measure the total latency between the master and slave systems. It should also be noted that the timer used to time the latency for message transmission from master to slave back to master must have a resolution of at least two times the frame scanning frequency, although higher frequencies are better. Higher frequencies provide a smaller granularity and more accurate computation of latency between the master and slave systems. In the preferred embodiment, the latency timer ticks at 96 times the frame rate of the master system (processing block 820). In processing block 822, the one way latency ($t_L$) is divided by the number of timing units per frame (i.e., 96 in the preferred embodiment). The resulting dividend of this division is the number of frames of latency, denoted $t_{FL}$. The resulting remainder is the number of timing units that have elapsed into processing a frame in the master system when the "Echo Reply" message was received by the master system. This additional latency is denoted subframe unit latency (or simply unit latency) or $t_{UL}$ (processing block 822). In decision block 824, the unit latency $t_{UL}$ is tested to determine if the unit latency is within the sync jitter range of the next higher frame VBI. Jitter is a well known phenomenon which occurs between any two systems with independent clocks. We use the term "sync jitter" to denote jitter acceptable to still consider ourselves to be in sync. In the examples described herein, the sync jitter is assumed to be three time units, however, it will be apparent to those of ordinary skill in the art that the actual sync jitter can be a different value. Because the arrival time of a message is measured relative to the display timing, the message can be expected to arrive in a time range of ± half of the data transmission clock period relative to the display clock period. The actual message arrival time can shift within this time range causing a jitter effect. Sync jitter is significant in the present invention because it may cause a message to arrive just before or just after a VBI if the expected arrival time is close to the beginning or end of a frame time in the destination system. Therefore, if the unit latency value is within the sync jitter range of the next higher frame VBI (processing path 826), an additional frame time of latency is added to the frame latency $t_{FL}$ (processing block 830) and is called the adjusted frame latency $t_{AFL}$. Adding this additional frame time of latency assures that sync jitter will not cause a late message to thwart the synchronization process. In processing block 832, the adjusted frame latency value, denoted $t_{AFL}$, is rounded up to the next higher value to produce the computed frames of latency, denoted $t_{CL}$. Because the overall latency determined in processing block 822 includes the frame latency plus the unit latency, the computed frame latency must be rounded up to provide enough latency in the synchronization process to assure that messages passed from one system to another will arrive at or before an expected arrival time.

Figure 13A:
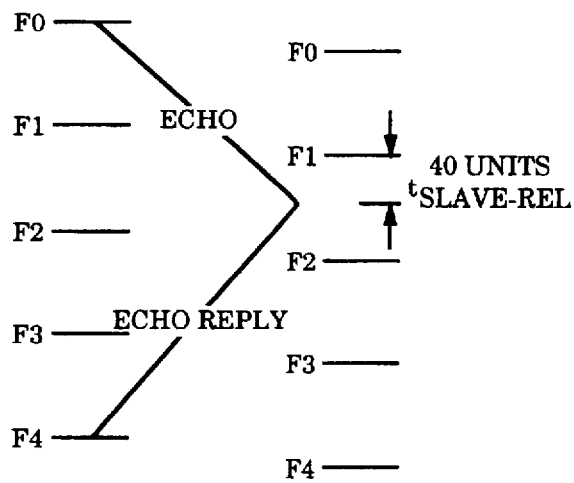
FIGS. 13a and 13b illustrate an example of the latency calculation.
Figure 13B:
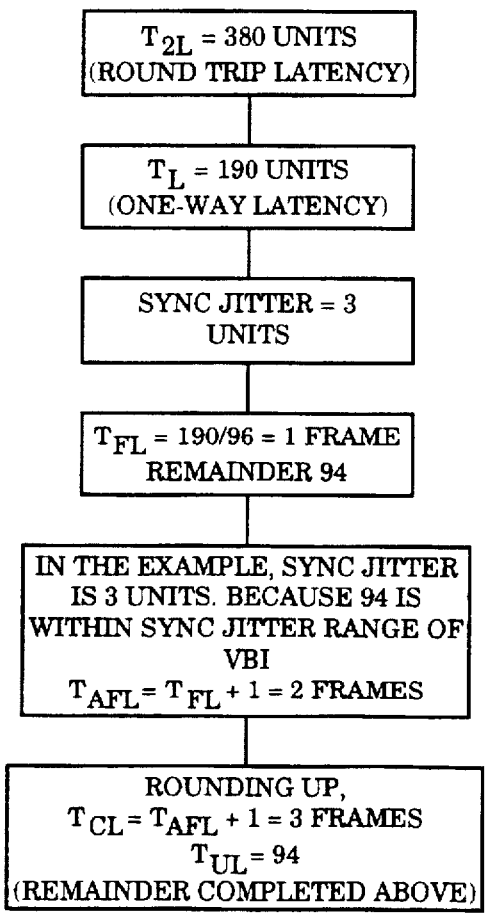

Referring now to FIGS. 13a and 13b, an example shows the latency calculation processing used in the preferred embodiment of the present invention. Referring now to FIG. 13a, an example shows a frame time diagram for a System A and a System B. Frame VBIs for System A and System B occur at intervals of 96 time units. System A sends an Echo message to System B which causes System B to send back the Echo Reply message with the time since last slave VBI ($t_{slave-rel}$) encoded into the message. In this example, $t_{slave-rel}$=40 units. System A receives the Echo Reply message 380 time units after sending the Echo message. This is $t_{2L}$, the round trip latency. $t_L$ is half of $t_{2L}$ or 190 units, as shown in FIG. 13b. Sync jitter is added to $t_L$ since in the worst case, sync jitter would be added to the latency. Then, $t_L$ is divided by the frame interval (96) to yield $t_{FL}$, a dividend of 1 with a remainder of 94. The remainder is $t_{UL}$. IF $t_{UL}$ is within sync jitter range of VBI (94 is within sync jitter (3) of 96), $t_{AFL}=t_{FL}+1=2$ frames. $t_{AFL}$ is rounded up by one to produce $t_{CL}=3$ and $t_{UL}=94$.

Referring back to FIG. 3, the computed frames of latency $t_{CL}$ is thus computed in block 832. Processing for establishing synchronization then continues at the bubble labeled B illustrated in FIG. 4.

It is desirable to align the VBIs of the two systems so as to minimize data arrival uncertainty and therefore minimize latency. This is accomplished by determining the skew in timing units and computing how far either the master or the slave needs to slew in order to minimize the skew.

Figure 4:
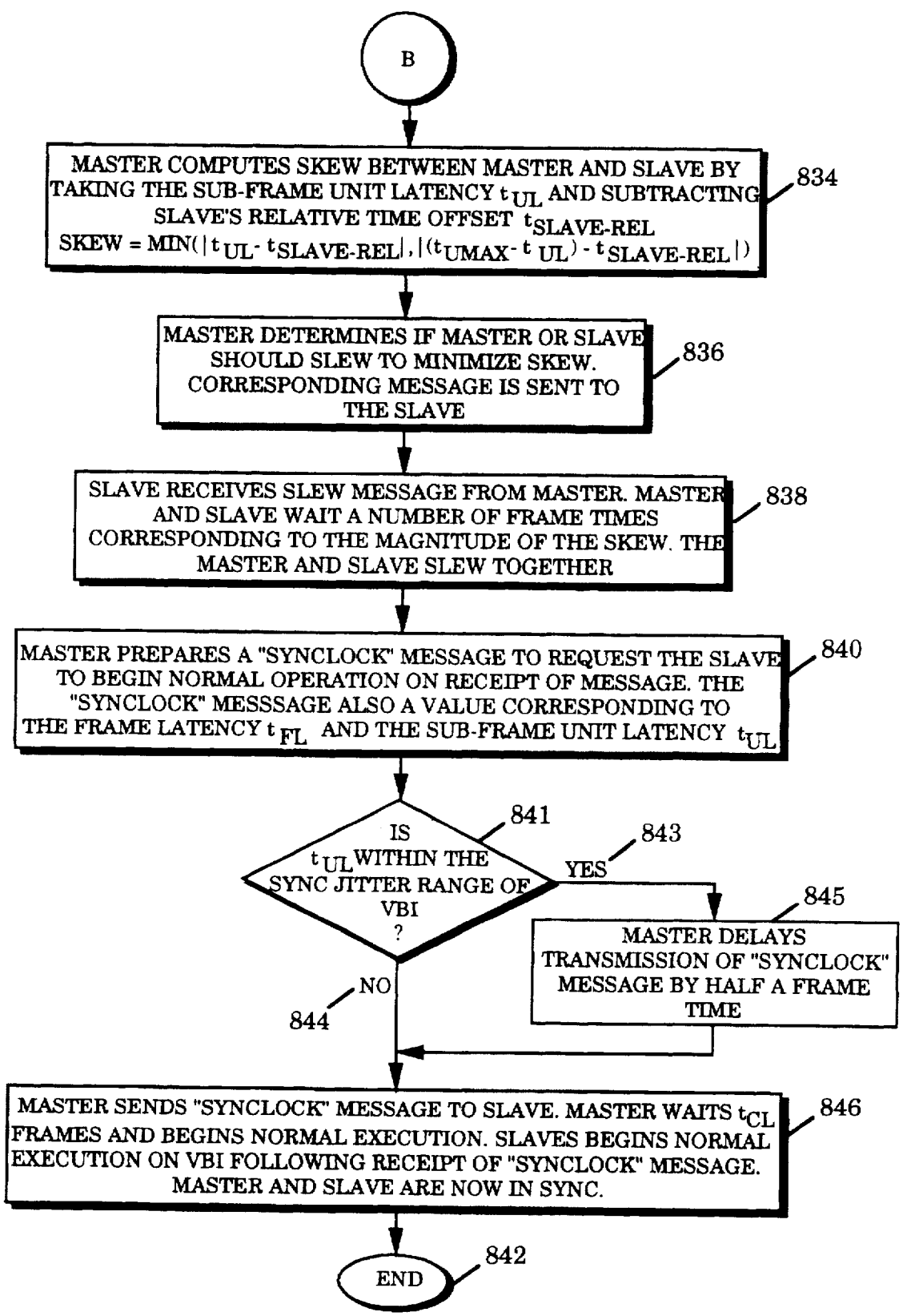

Referring now to FIG. 4, processing logic for establishing synchronization in the present invention continues at the bubble labeled B. In processing block 834, the master system computes the skew between the master and slave by taking the sub frame unit latency ($t_{UL}$) and subtracting the slave system's relative time offset ($t_{slave-rel}$) as illustrated in the following equation:

$$skew=MIN\ (|t_{UL}-t_{slave-rel}|, |(t_{UMAX}-t_{UL})-t_{slave-rel}|)$$

where $t_{UMAX}$=the number of units per frame (In the preferred embodiment, $t_{UMAX}$=96).

Figure 14A:
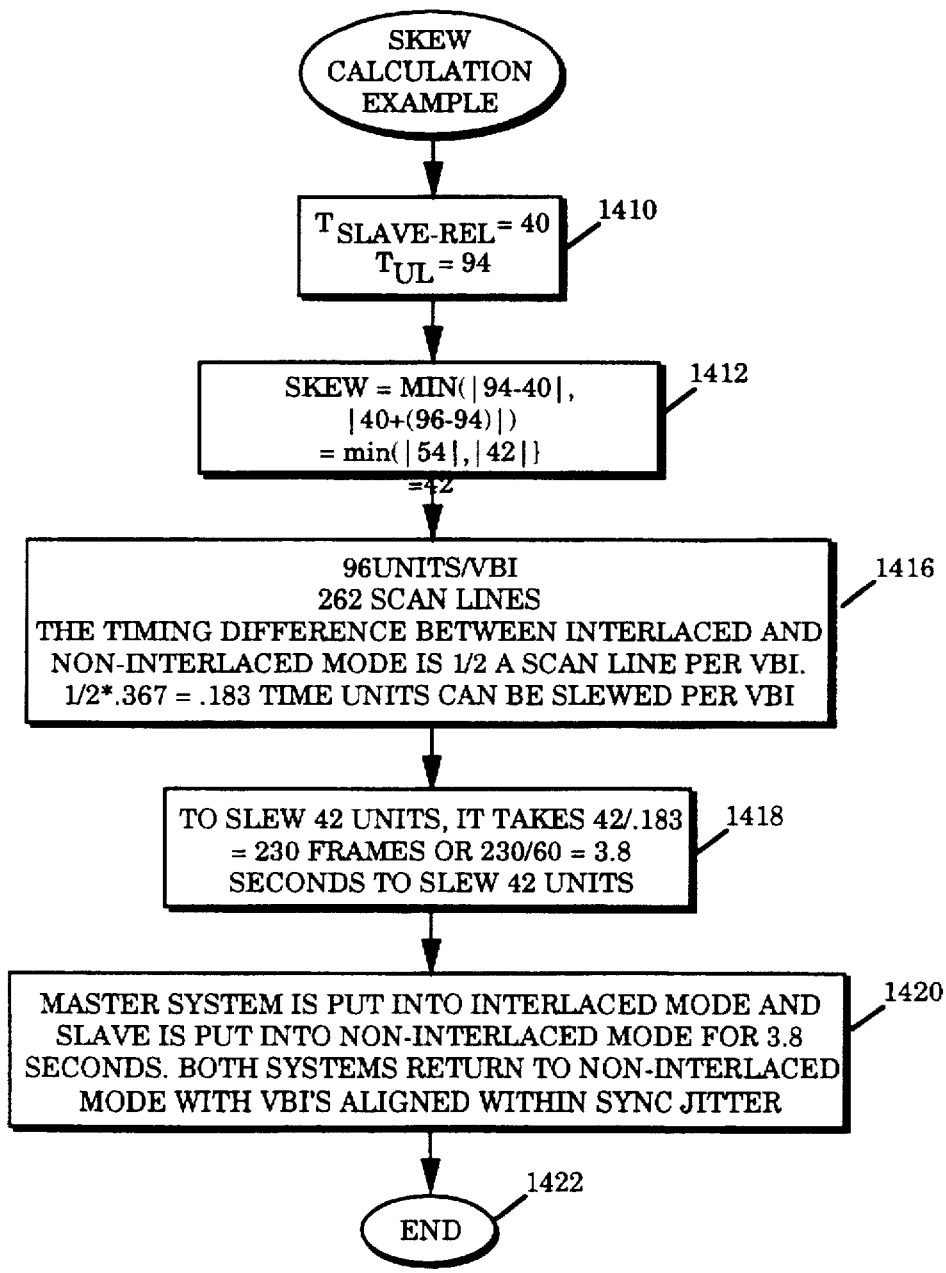
FIGS. 14a and 14b illustrate an example of the skew calculation.
Figure 14B:
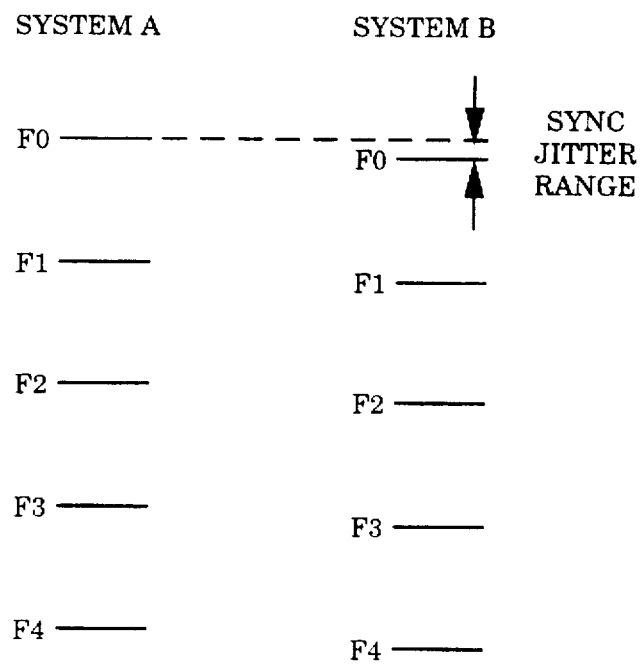

This computation determines the timing difference between the display of the same frame in the master and slave systems. The skew defines how far out of synchronization the slave system is from the master system (processing block 834). In processing block 836, the master determines if the master or the slave should slew to minimize the skew. This is determined by which side of the MIN function in the above equation is smaller. In the preferred embodiment, each system is able to slew its timing in one direction only. This technique is described in the above-referenced co-pending patent application. Using this technique, the timing of a raster display system is modified using interlaced and non-interlaced mode. A particular raster display system can invoke an alternate display mode to slew the timing for the system in a single direction. In other alternative embodiments, the video timing is modified using other methods, such as lengthening scan lines, adding scan lines, or adjusting the video clock frequency. Once the skew is known as computed in processing block 834, the master determines which system should slew to bring both systems into synchronization. A message is formulated by the master to notify the slave of which system will perform the slewing operation (processing block 836). The slave receives the slew message from the master in processing block 838. The master and slave wait a number of frame times corresponding to the magnitude of the skew. Because the master knows the magnitude of the skew, it can determine the number of frames displayed in an alternate display mode that it will take to slew the two systems back into synchronization. Thus, since the difference in frame length between interlaced and non-interlaced modes of operation is half a scan line, by placing one display system in interlaced mode and the other in non-interlaced mode, the systems will slew relative to each other by one scan line every two 60 Hz NTSC frames (or every two 50 Hz frame time for PAL/SECAM). The master system, the slave system, or both systems activate alternative display modes to slew their relative frame timings together (processing block 838). An example of the skew calculation is shown in FIG. 14a and the resulting frame timing is shown in FIG. 14b. In alternative embodiments, the video timing is adjusted using methods other than interlace/non-interlace timing adjustments. In each case, the two systems are slewed back into synchronization.

Figure 15A:
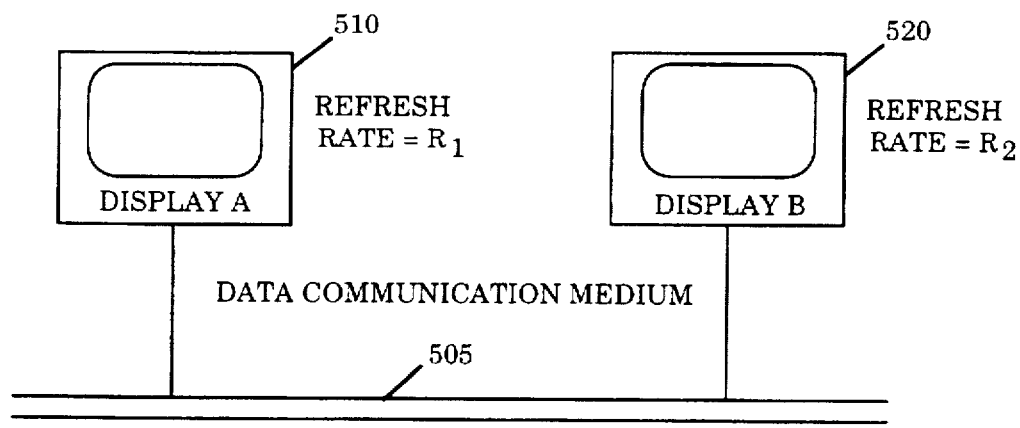
FIGS. 15a, 15b, and 15c illustrate an example of the processing of a "synclock" message.
Figure 15B:
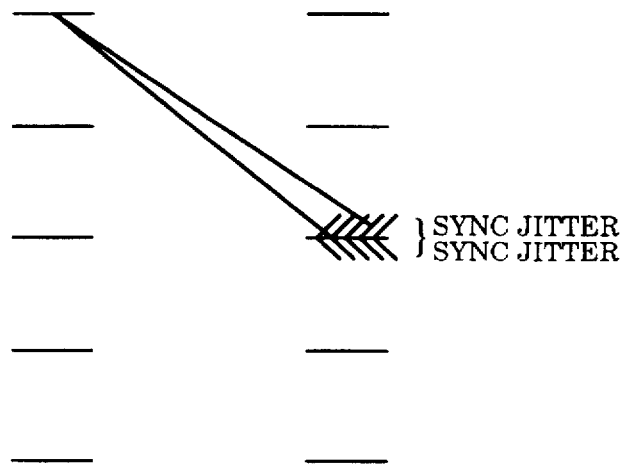
Figure 15C:
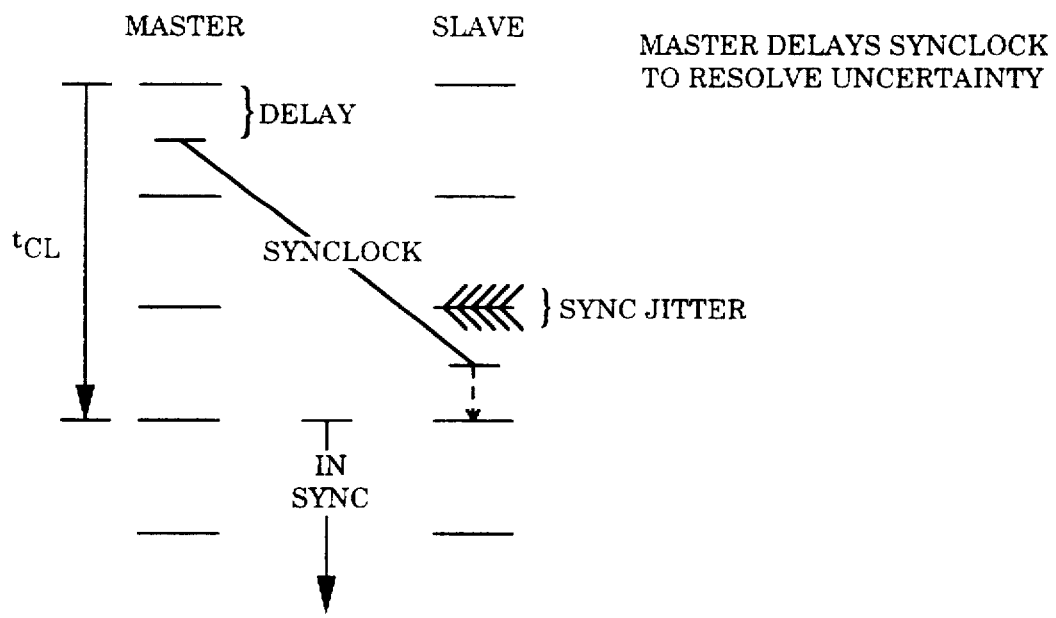

Referring back to FIG. 4 in processing block 840, the master prepares a "SYNCLOCK" message to the slave requesting the slave to begin normal operation on receipt of a message from the master. This message also contains a value corresponding to the frame latency $t_{FL}$ and sub-frame unit latency $t_{UL}$. If the unit latency is within sync jitter of VBI, (block 841), there is uncertainty as to whether the message will arrive before or after VBI. Since it is essential that the master and slave are synchronized to the same VBI, this uncertainty must be resolved. In the presently preferred embodiment, if the expected arrival time of the message is within sync jitter of VBI, the master delays sending the message by half of a frame time so that the message will definitely arrive later than VBI, thus resolving any uncertainty (block 845). An example of this case is shown in FIGS. 15b and 15c. If the unit latency is not within sync jitter of VBI, no delay by the master is required. This simpler case is illustrated by example in FIG. 15a. The sync lock message from the master triggers the slave to activate normal operation starting at the next VBI (block 846). The master, on the other hand, waits $t_{CL}$ frames and then begins normal operation itself (block 846). At the completion of these steps, the master and slave systems are now displaying the same frames and are in synchronization (processing block 846). Processing for establishing synchronization then terminates through end bubble 842.

Maintaining Synchronization

Figure 5:
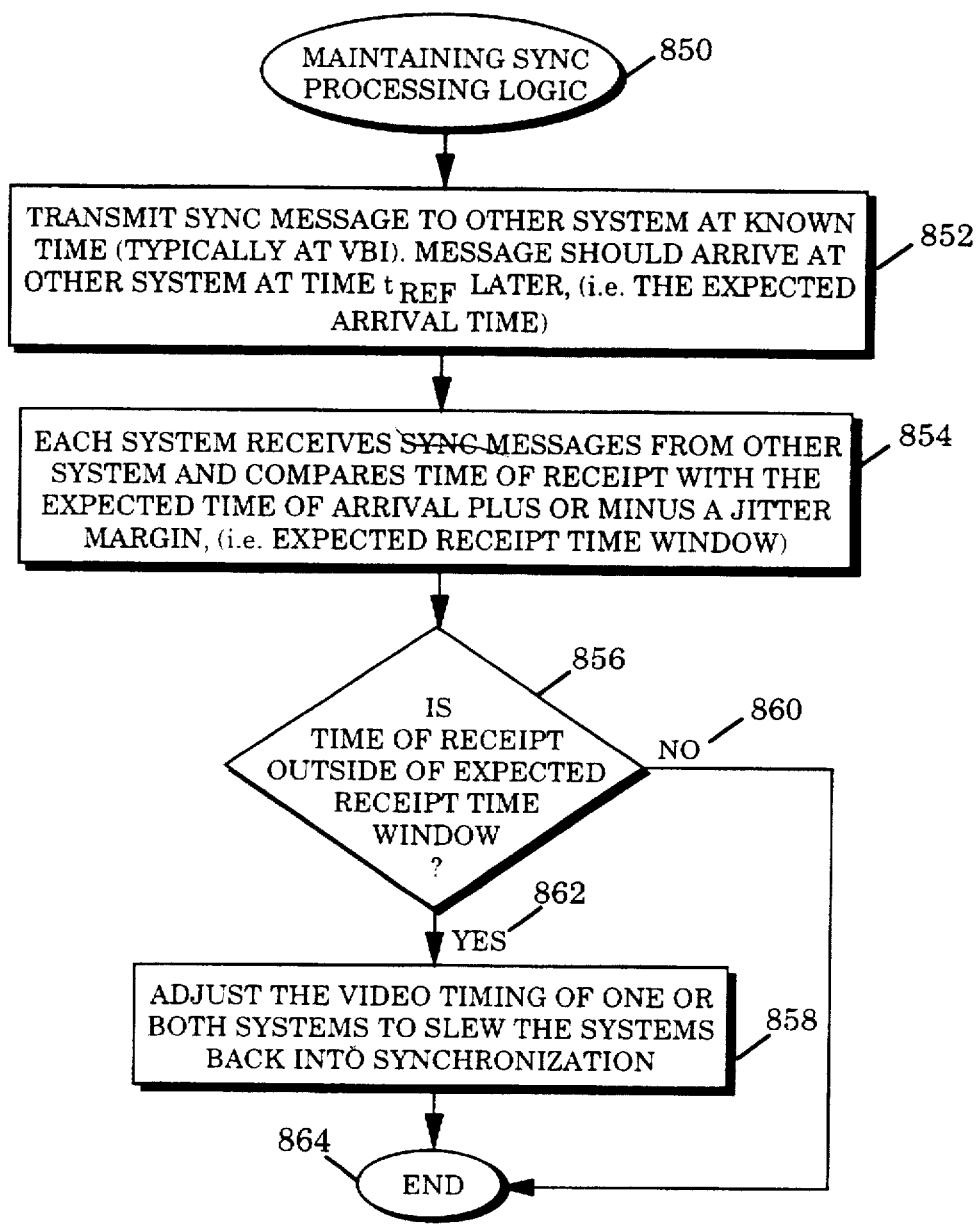
FIG. 5 is a flowchart illustrating the processing logic of the present invention for maintaining synchronization.

Referring now to FIG. 5, the processing logic for maintaining synchronization in the preferred embodiment of the present invention is illustrated. Because of the operation of the processing logic for establishing synchronization as described above and illustrated in FIGS. 2–4, the master and slave systems have been slewed into synchronization. Due to slight variations in the oscillators of each independent video game system, the master and slave systems will eventually albeit slowly drift out of synchronization.

At a known time each frame time (typically at VBI), each system sends a sync message to the other. Each system expects to receive the sync message at a pre-determined time $t_{REF}$, computed during the aforementioned initial synchronization process as a function of $t_{UL}$. Each system receives the sync message from the other system and compares the time of receipt with $t_{REF}$±jitter margin. The jitter margin is a time range or window within which sync jitter occurs. The jitter margin, typically defined as twice the time range experienced for sync jitter, provides a means for allowing the expected arrival time of the sync message to error within a predetermined time range or time window (processing block 854). If the expected arrival time for the sync message is within this jitter margin or expected receipt time window, processing path 860 is taken to terminate the synchronization process for this cycle. In this case, the master and slave systems are within an acceptable synchronization range. However, if the time of receipt of the sync message is outside of the jitter margin or expected receipt time window, processing path 862 is taken to processing block 858. In this case, the master and slave systems have fallen out of synchronization and must be slewed back into synchronization. In the preferred embodiment, the master and slave systems are slewed back into synchronization by invoking an alternate display mode in one or both systems to slew the systems back into synchronization (processing block 858). The apparatus and method for invoking an alternate display mode to adjust video timing is described in the above-referenced co-pending patent applications. In alternative embodiments, the video timing is adjusted using other methods mentioned above. In each case, the two systems are slewed back into synchronization by adjusting the video timing. Once the master and slave systems have been slewed back into synchronization using this process, processing terminates for this cycle through end bubble 864.

Figure 6:
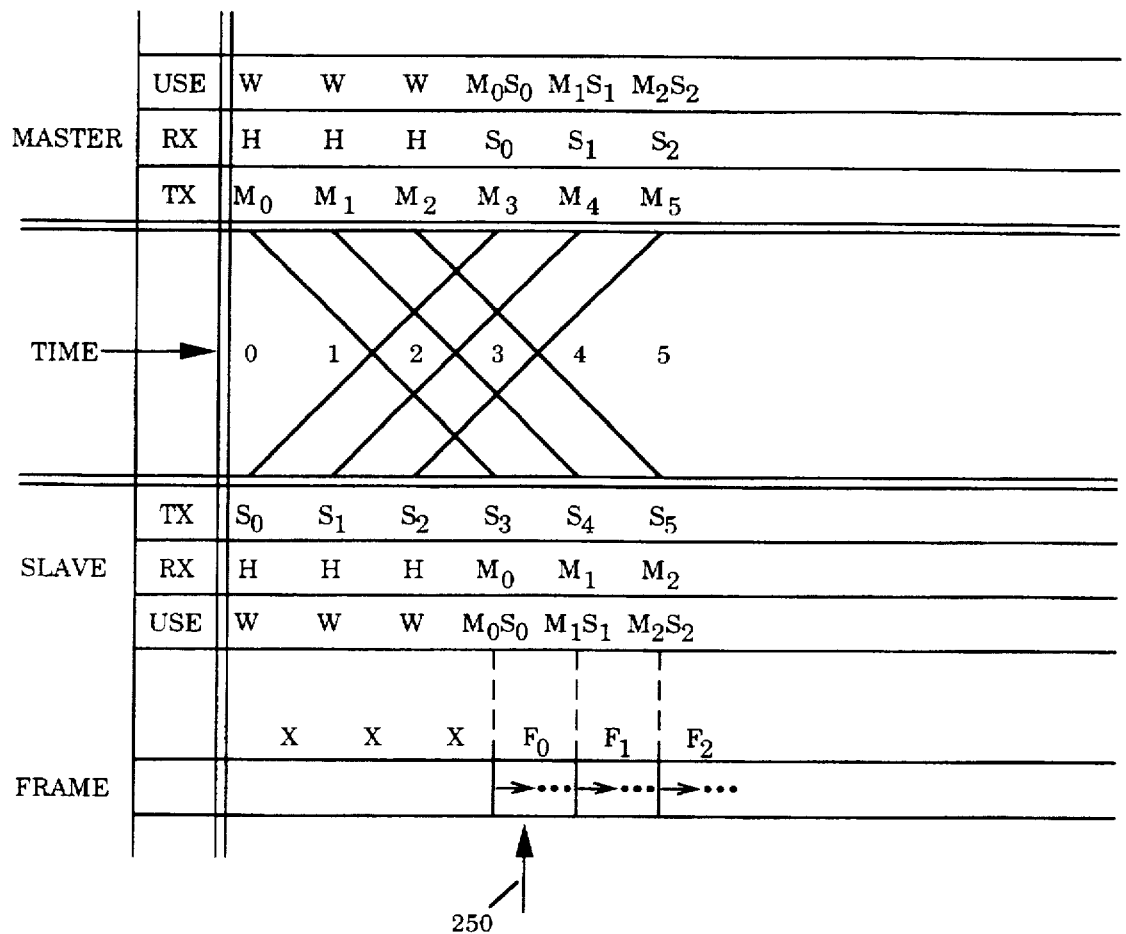
FIGS. 6 and 7 are time lines illustrating the messaging transactions between two networked video game systems.
Figure 7:
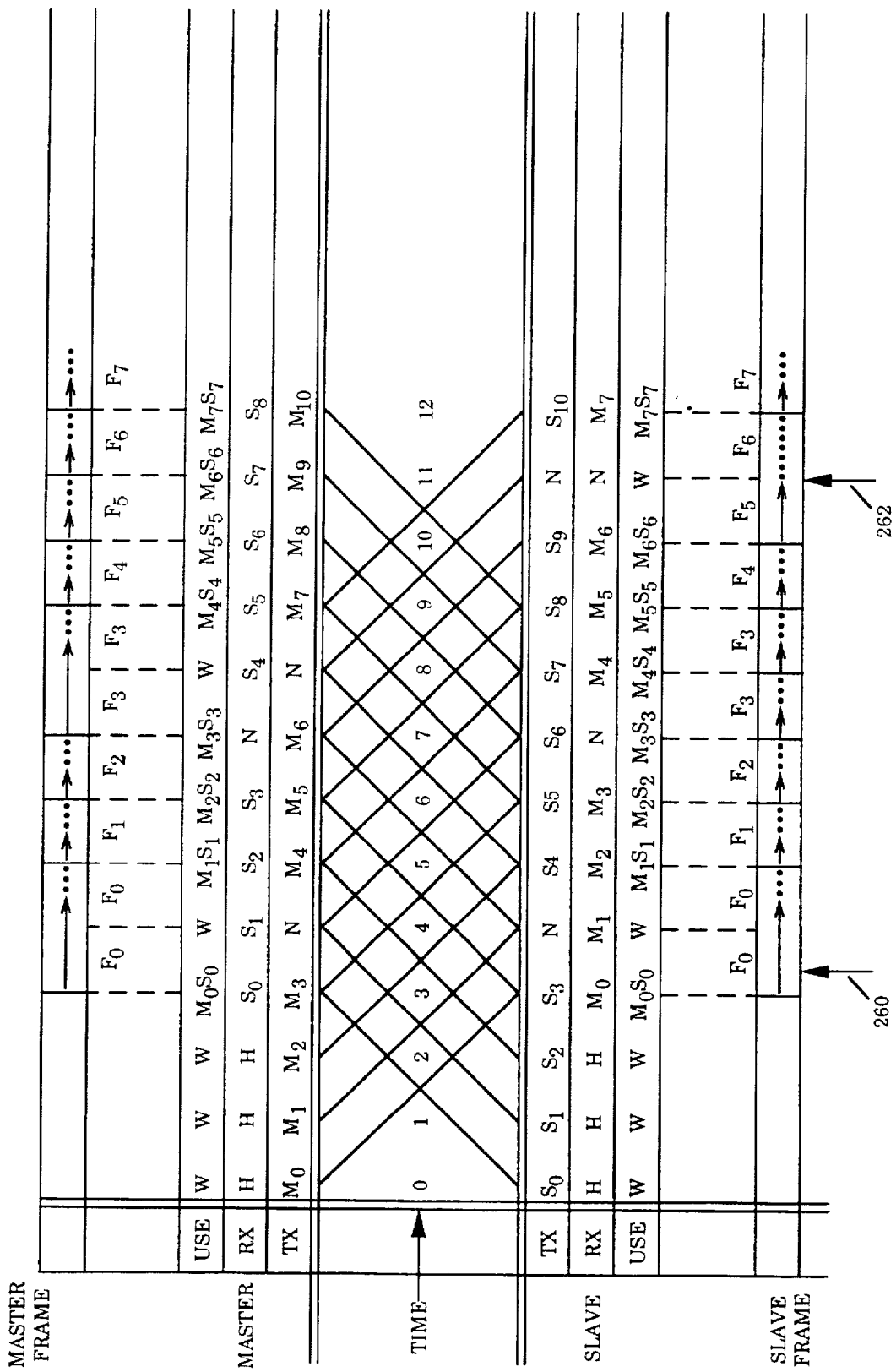

Referring now to FIGS. 6 and 7, a timeline illustrates the message traffic occurring over the communications medium between a master system and a slave system during normal run mode operation of the present invention. Referring to FIG. 6, the messaging events from the master system perspective is illustrated in the upper portion of FIG. 6 and the messaging transactions from the slave system perspective are shown in the lower portion of FIG. 6. Time advances from the left hand side of FIG. 6 toward the right hand side in increments of one unit per frame time. In the master system portion of FIG. 6, three types of actions are indicated in three rows marked, 1) TX for the transmission of a message by the master, 2) an RX row for the receipt of messages by the master system, 3) a USE row indicating how a message is used by the master system during that frame time. A similar set of actions are indicated by three rows (TX, RX, and USE) in the slave system portion of FIG. 6. The events occurring in these three action rows for each system occur at a frame time corresponding to the column in which an event is indicated. As an example of this notation, at time 0 the master system transmits a message $m_0$ to the slave system. The slave system receives message $m_0$ from the master system at time 3. This is indicated in FIG. 6 by the $m_0$ notation in the RX row of the slave system at the column corresponding to time 3.

The examples of the messaging transactions illustrated in FIGS. 6 and 7 presume a data transfer latency between the master and the slave system of three frames. Thus, a message sent at time 0 from the master system is received by the slave system three frame times later (i.e., time 3). It will be apparent to those of ordinary skill in the art that other networked video game systems may have a greater or lesser degree of latency. The present invention operates equivalently with these other degrees of latency.

Referring again to FIG. 6, message $m_0$ is received by the slave system at time 3. Also at time 3, the slave system uses the data from message $m_0$ from the master system along with data so from the slave system corresponding to frame F0 of both systems. This is indicated in FIG. 6 by the notation $m_0s_0$ shown in the time 3 column of the USE row of the slave system. The data in these messages corresponds to information indicating player game controller device activations. The data in $m_i$ messages contain game controller data from the master system game controller. The data in si messages contain game controller data from the slave system game controller. As indicated in the lower portion of FIG. 6, the frame displayed on both the master and slave systems is indicated by the row marked FRAME in FIG. 6. Thus, at time 3, frame F0 is processed from the beginning of time 3 to a time prior to the next frame time at time 4 as indicated by the arrow 250 which is shown as terminating with an arrow head prior to the beginning of time 4. A synchronized system must guarantee that the data $m_is_i$ is available prior to the start of processing for frame $f_i$. FIG. 6 shows normal run mode operation of the networked game system of the present invention with a three frame latency, by way of example. The master system sends messages, such as $m_0$, which are received and used by the slave system three frames later.

Similarly, the slave system sends messages, such as message $s_0$ to the master system, which are received and used three frames later by the master system. This is indicated by the notation $s_0$ in the RX row of the master system at time 3 and the notation $m_0s[<i]nf0$ in the USE row of the master system at time 3. As long as no errors or unusual delays occur during data transfer between the master and slave system, the messaging transactions represented in FIG. 6 continue in the illustrated fashion as time elapses from the left toward the right hand side of the figure. This is true as long as the data corresponding to each frame is received by each system prior to processing of that particular frame. Thus, as long as the processing for each frame, as indicated by line 250 for example, completes prior to the start of the next frame, each system can send and receive frame controller data without losing execution synchronization and without dropping frames.

Referring still to FIG. 6, the events occurring from time 0 through time 2 are now explained. Because the sample system illustrated in FIG. 6 has a three frame latency, on initial start-up of the networked game system, the master system and the slave system do not receive messages from each other at time 0, 1, and 2. This is indicated in FIG. 6 by the notation H for hold marked in the RX row of the master and slave system at time 0, 1, and 2. Because no data has been received yet by the master or slave system during these frame times, the master and slave systems have no data to use. Thus, the USE row of the master and slave system is marked with a W for wait at time 0, time 1, and time 2. This first three frames of delay is denoted the receive hold off or RXHOLDOFF operation of the present invention. Because it takes at least the number of latency frame times to get frame data to each system, the operation of the system must be delayed for the latency or RXHOLDOFF time.

Referring now to FIG. 7, a similar timeline diagram illustrates the messaging transactions for a situation where frame processing for a particular frame cannot be completed prior to the start of a subsequent frame. In this case, the processing of the present invention must perform additional synchronization operations to make sure that the master and slave systems remain synchronized on the same frame. In FIG. 7, processing for particular frames is not completed prior to the start of a subsequent frame. In this situation, a number of operations must occur to re-establish synchronization between the master and the slave system.

As shown in FIG. 7, the messaging transactions from the master perspective are illustrated in the upper portion of FIG. 7 and the messaging transactions from the slave perspective are illustrated in the lower portion of FIG. 7. As in FIG. 6 for example, the master system transmits message $m_0$ at time 0 and the slave system receives message $m_0$ at time 3. The slave system uses message $m_0$ with slave data $s_0$ as indicated by the notation $m_0s_0$ in the time 3 column of the USE row of the slave system. This data $m_0s_0$ is used during processing of frame F0 as indicated by the F0 notation in the slave frame row at the start of time 3 in the lower portion of FIG. 7. In the example of FIG. 7, however, the processing for frame F0 extends beyond the start of the next frame (i.e., F1) as indicated by line 260 in FIG. 7. Even though message $m1$ having data corresponding to frame F1 has been received by the slave system at time 4, the data for message $m_1$ cannot be used until processing for frame F0 has been completed. Thus, the slave system's usage of message data from the master system must be delayed until processing for the previous frame (frame F0) has been completed. This delay is indicated in FIG. 7 by the W for wait in the time 4 column of the USE row of the slave system. This delay event occurring in the slave system must be communicated to the master system to assure that the master system does not get a frame ahead of the slave system. To this end, the slave system transmits a "no data" message at time 4 to the master system. The transmission of this "no data" message to the master system is indicated in FIG. 7 by the N in the time 4 column of the TX row of the slave system. This "no data" message is received by the master system at time t7 as indicated by the N in the time 7 column of the RX row of the master system. Because the master system detects that this message contains no data, the message data is not stored in a receive first in first out buffer (RXFIFO). The use of this buffer is described below.

The time line of events illustrated in FIG. 7 shows two types of significant synchronization problems handled by the present invention. First, a problem occurs when both the master system and the slave system cannot complete frame processing within a frame time for the same frame. This problem is illustrated in FIG. 7 for frame F0 of both the master and slave systems between time 3 and time 5. Both the master and slave systems must wait one frame time as indicated by the W in the time 4 column of both the master system USE row and the slave system USE row. Similarly, both systems send a "no data" message to the other system as indicated by the N in the TX row of both the master and slave systems. The "no data" message is received by the other system latency frames later (i.e., time 7 in this example). Because both systems experience an offsetting one frame time delay, there is no loss of synchronization caused by the delay. In the practical application of the present invention, these types of mutual frame delays are the most prevalent type of synchronization event. Empirical evidence indicates that these types of events account for 98% of the situations where a frame time is missed. In fact, some video games frequently extend processing for a particular set of player game controller data beyond a single frame time. The concept of a "game loop" is thus useful for describing this situation.

A game loop is a single iteration of game instructions for processing one set of game controller data or for processing one animation state of the game. In less complex games, a game loop corresponds to one frame time and the game controller activations are newly applied to each frame. In more complex games, a single frame time may not provide enough time to complete a game loop. Such is the case with the mutual F0 frame delay described above. As long as each system knows the other was delayed, the two systems can each apply the current controller to the same frame and thus remain execution synchronized.

Referring again to FIG. 7, a second problem may occur which affects the synchronization between two networked video game systems. Although this second problem occurs relatively infrequently (about 2% of the time game loops extend beyond a frame time), the problem nevertheless must be handled. In FIG. 7, note that frame F3 in the master system has extended beyond one frame time but frame F3 in the slave system has not. The delay of one frame for one system and not the other can be caused by a sync jitter boundary problem or some other reason. When this occurs, in the master system for example, it is necessary to cause a corresponding delay in the slave system. This is handled by the present invention with the transmission of a "no data" message by the master system at time 8 as indicated in FIG. 7 by the N in the time 8 column of the TX row of the master system. Transmission of this message by the master is caused by the inability of the master to complete its game loop of frame F3 data by the start time of frame 4 (i.e., at time 8). The slave system receives the "no data" message latency frames later (at time 11 in this example). This is indicated by the N in the time 11 column of the RX row of the slave system. Because the slave system received the "no data" message at time 11, the slave system delays the processing of frame F6 for a frame time as indicated by line 262 and the W in time 11 column of the USE row of the slave system. The one frame delay of the slave system re-synchronizes the slave system with the master system and effectively solves this type of synchronization problem in networked video game systems.

Figure 8:
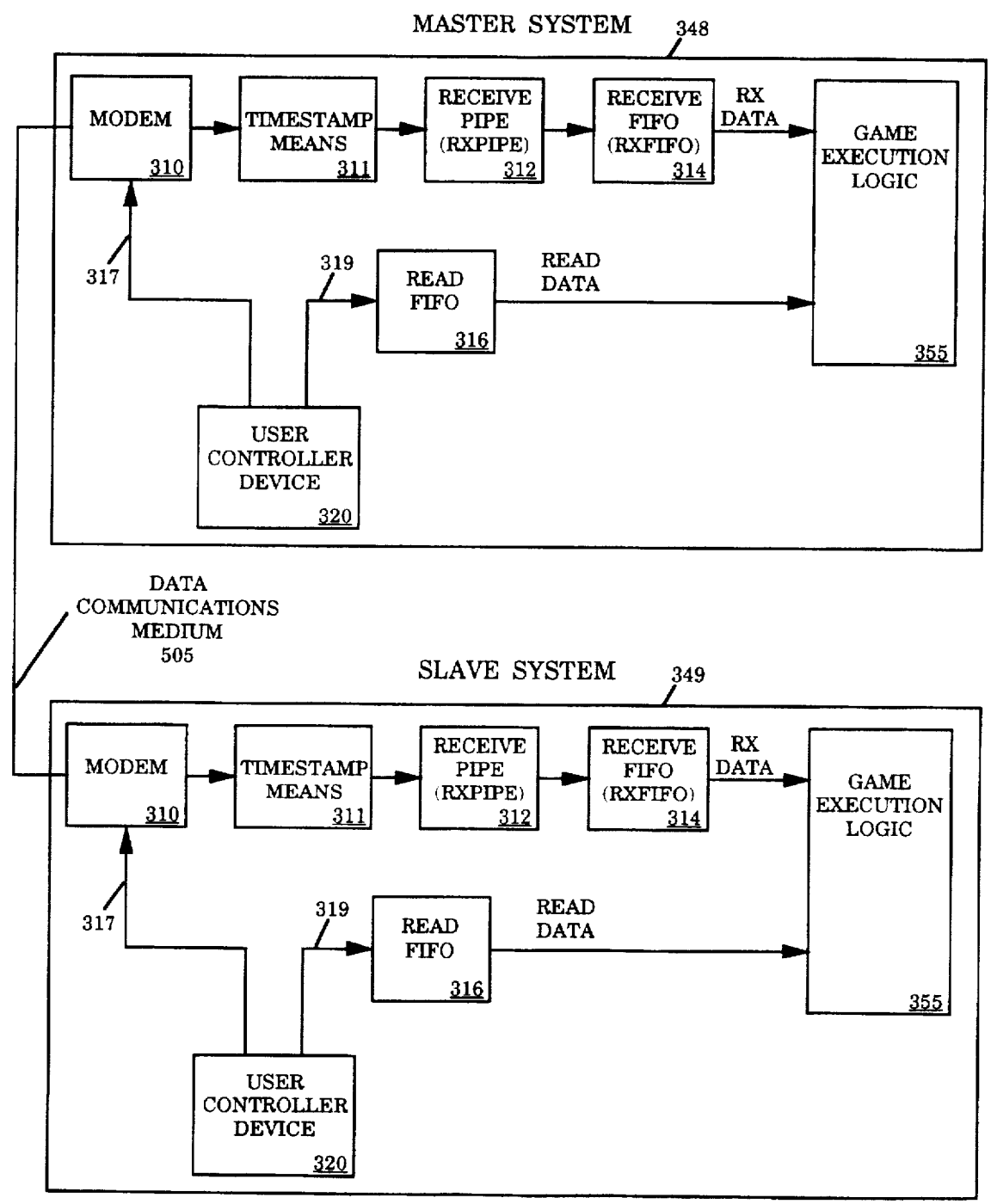
FIG. 8 illustrates the queuing system used in the preferred embodiment.

Referring now to FIG. 8, a block diagram illustrates the queuing or buffering mechanism used in the preferred embodiment. Both the master and slave systems include a modem 310 for transmitting data across the communications medium. This modem is coupled to a time-stamping means 311 which is coupled to a receive pipe 312 (RXPIPE) which comprises a buffer for assembling and storing messages with time-stamps received from the other system. For example, a message may arrive from the modem of the video game system as a series of bytes. The bytes making up a message may all arrive in one frame, or some may arrive during one frame and some may arrive during the next frame. The RXPIPE assembles those bytes into complete messages (with the time-stamp corresponding to the last byte) which, are presented to the RXFIFO, unless the message is a "no data" message. The RXPIPE 312 provides storage for a number of messages corresponding to at least twice the frame latency between the two game systems. Thus, the RXPIPE 312 provides a staging buffer for holding messages prior to their usage by the receiving system. RXPIPE 312 is coupled to a receive FIFO (RXFIFO) 314 which comprises a buffer of messages that will actually be used by the receiving system. The receive FIFO 314 does not contain "no data" messages received from the other system. The output of receive FIFO 314 (RXDATA) is sequentially fed to the frame processing logic of the receiving system for generating a subsequent frame.

Modem 310 is coupled to a player controller device 320 of each game system. For a Sega or Nintendo game system for example, the player controller device 320 is the hand held game controller comprising buttons for manipulating game objects on the display screen. Data corresponding to these button or function key activations of user controller device 320 are formulated into messages and sent to the other game system via modem 310 and data communications medium 505. Concurrently, the controller data for each system is output from user controller device 320 to a read FIFO 316 on line 319. Read FIFO 316 comprises a buffer for the storage of local controller data prior to usage as read data by the local game system execution logic 355. Because the local controller data may not be used immediately for current frame processing (i.e., the controller data must be delayed $t_{CL}$ frames to match the received data arrival time), the read FIFO 316 is necessary for staging this local controller data for subsequent usage. In this manner, the remote controller data coming in from the other system through modem 310, RXPIPE 312, and RXFIFO 314 can be synchronized with local controller data coming in from user controller device 320 through read FIFO 316.

Figure 9:
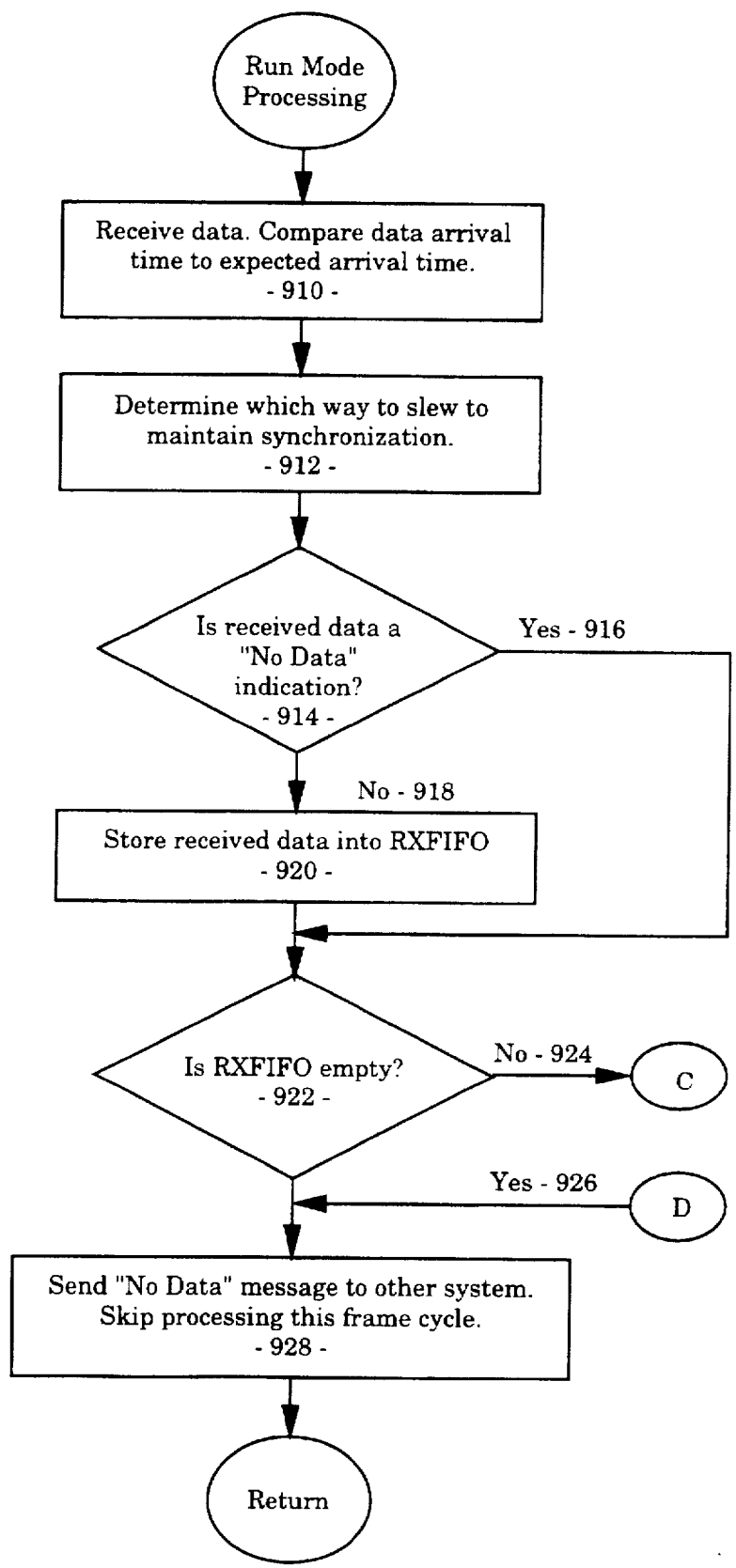
FIGS. 9–12 are flowcharts illustrating the processing logic of the present invention for handling run time mode and error conditions.
Figure 10:
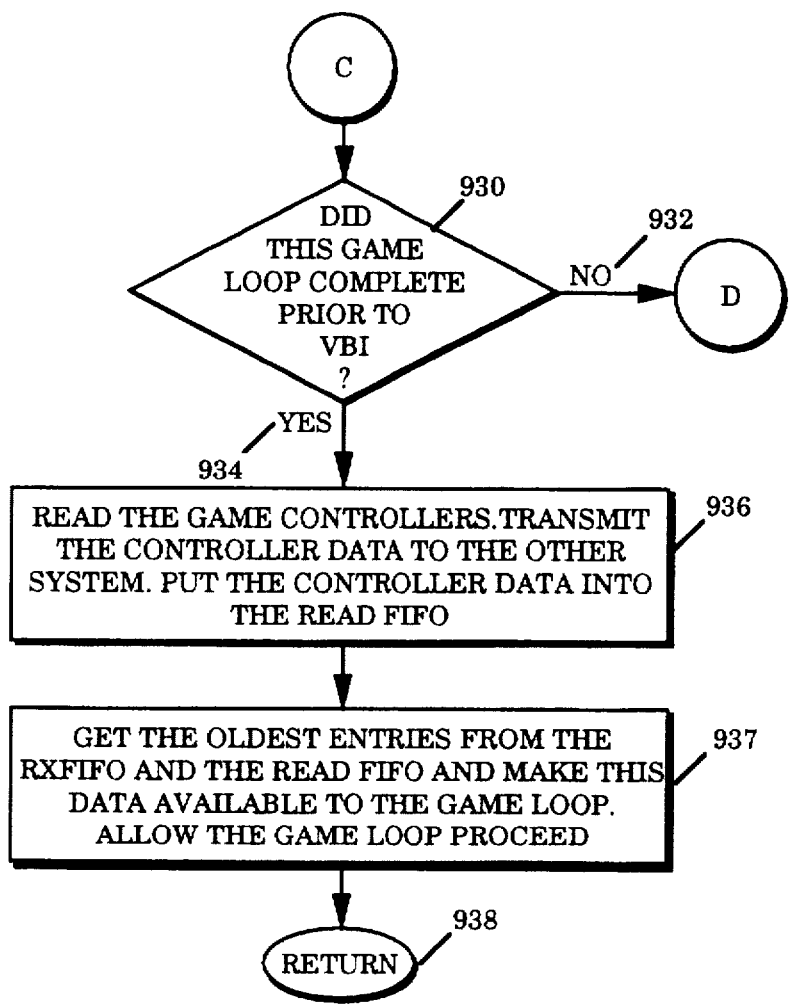

Referring now to FIG. 9, the run mode processing of the present invention is illustrated. The run mode processing of the present invention takes place after the initial synchronization of the two game systems has taken place as described above in connection with the description of the processing logic for establishing synchronization. The run mode processing typically occurs during VBI in an interrupt routine. During run mode operation, the video game controller data is formulated into messages and passed to the other game system on the network via the communication medium. Examples of this process are illustrated in FIGS. 6 and 7 in a timeline form. The run mode processing logic of FIGS. 9 and 10 is performed by each system in support of this run mode operation. In processing block 910, the controller message data is received by modem 310 from the other game system. The arrival time for this received message is compared to an expected arrival time as described earlier. By this comparison, it can be determined if one system is falling out of synchronization with the other system (processing block 912). If this is the case, the video timing of one or both systems is adjusted to slew the two game systems back into synchronization. The message received in processing block 910 can be either a message containing actual controller information from the remote game system or the received message can be a "no data" message. As described above in connection with FIG. 7, a game system may be unable to consume the controller data for each frame at consecutive frame times. In this case, the "no data" message is used to notify the remote game system that a frame delay is necessary. If this is the case, processing path 916 is taken around processing block 920. If the received data message contains actual controller data and is not a "no data", processing path 918 is taken and processing block 920 is executed. In processing block 920, the received controller data is stored into the RXFIFO 314. In decision block 922, the RXFIFO is checked. If the RXFIFO is empty, processing path 926 is taken to processing block 928 where a "no data" message is sent to the other game system to notify the other game system that a game loop is being skipped. The RXFIFO 314 is empty if there is no available controller data from the remote system for processing by the local system.

If the RXFIFO 314 is not empty, processing path 924 is taken to the bubble labeled C as illustrated in FIG. 10.

Referring now to FIG. 10, run mode processing continues at the bubble labeled C. If the game loop in the local system completed prior to the current VBI (decision block 930), the game loop is ready to proceed with new controller data. In this case, the local controller data is read and transmitted via modem 310 to the remote game system in processing block 936 and also placed into the read FIFO 316. The normal game loop is allowed to proceed for processing the next frame using the oldest entries from the rxFIFO and the read FIFO. Run mode processing then terminates through the return bubble illustrated in FIG. 10.

Referring again to decision block 930, if the frame cycle did not complete prior to the VBI indicating the start of the next frame, processing path 932 is taken to the bubble labeled D illustrated in FIG. 9. Referring now to FIG. 9, processing for an incomplete frame cycle continues through the bubble labeled D. In this case, a "no data" message is sent to the remote game system notifying the remote system that a frame cycle has been skipped (processing block 928). Run mode processing then terminates through the return bubble illustrated in FIG. 9.

Error Recovery

Figure 11:
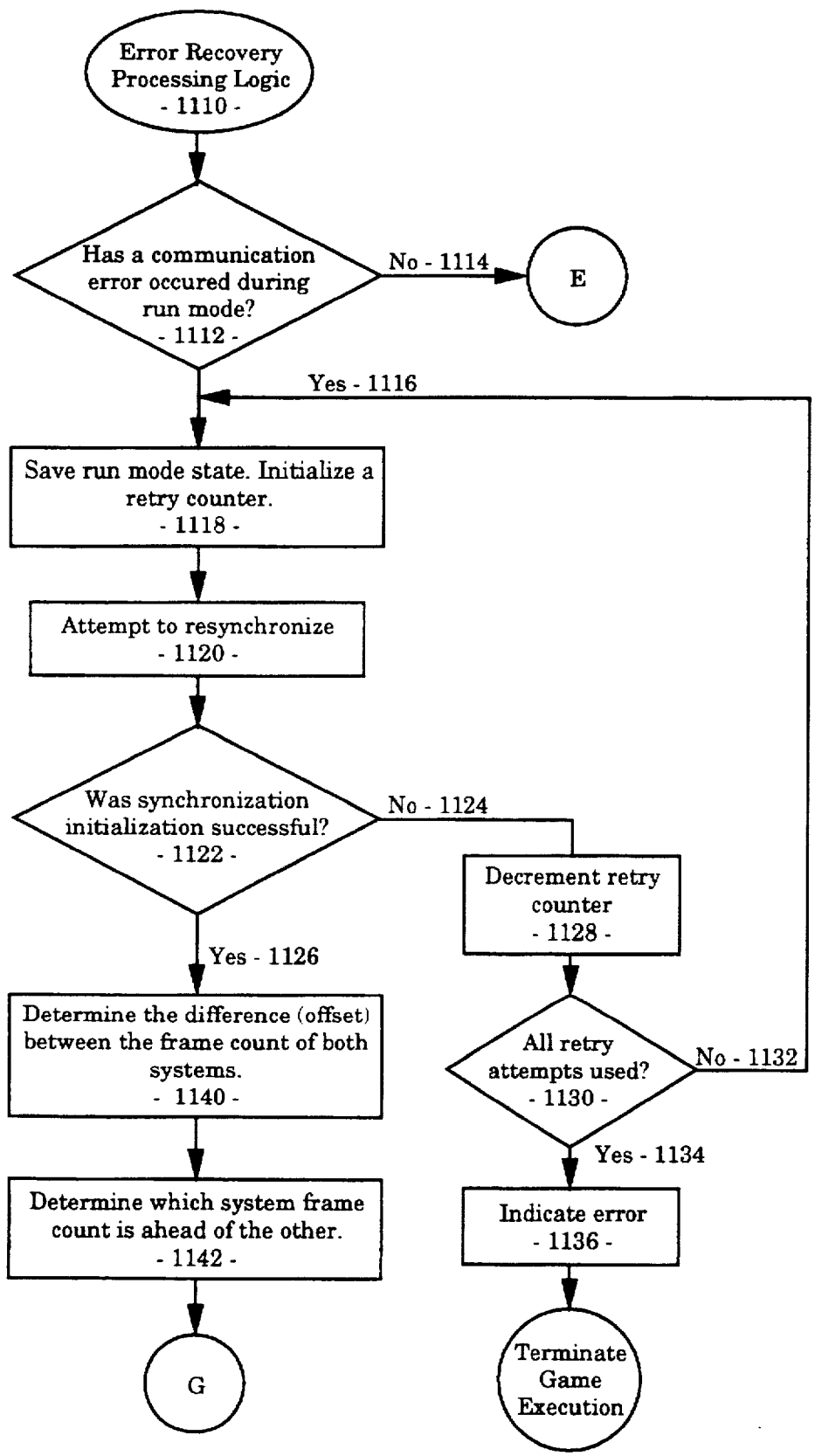

Referring now to FIG. 11, the error recovery processing logic 1110 of the present invention is illustrated. Messages must be sent with error detection capability between the video game systems. Prior art methods of checksumming the data, repeating the data, or other error detection means can be used. If a communication error occurs during run mode operation, such as when errors occur when line noise results from a person picking up an extension telephone, processing path 1116 is taken to processing block 1118. In this case, the run mode state information is saved and a synchronization retry counter is initialized (processing block 1118). Next, a loop is started for a number of retries at establishing synchronization with the remote system. In processing block 1120, the "establish synchronization" processing logic described above is activated. If synchronization is successfully established (processing block 1122), processing path 1126 is taken to processing block 1140. In this case, the frame count of the local system is compared with the frame count of the remote system to determine if a difference in the frame count exists (such as if one system received more frames of valid data during a noise event than the other). If so, the two game systems have fallen out of frame synchronization. If this is the case, the error recovery processing logic determines which system is one or more frames ahead of the other game system (processing block 1142). Error recovery processing logic then continues through the bubble labeled G illustrated in FIG. 12.

Figure 12:
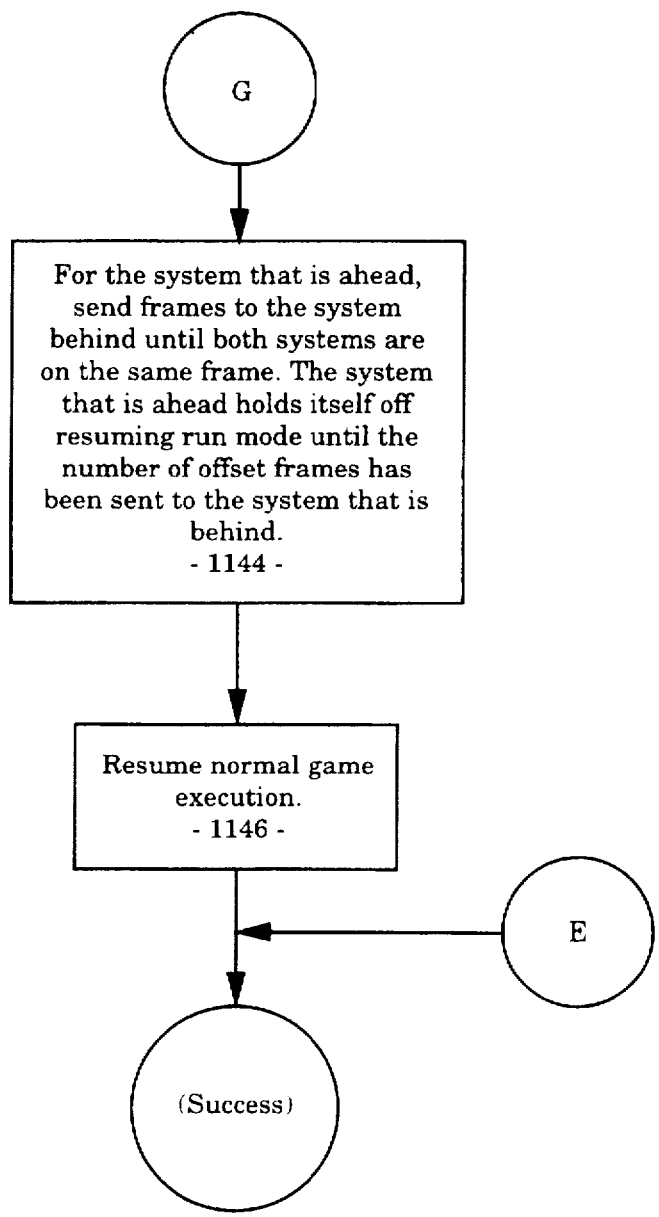

Referring now to FIG. 12, error recovery processing logic continues through the bubble labeled G. In this case, one game system is one or more frames out of synchronization with the other game system. For the game system that is one or more frames ahead, the system that is ahead sends controller data messages to the system that is behind until both systems are on the same frame. The system that is one or more frames ahead holds off resuming its run mode until the number of offset controller data messages (i.e., corresponding to the number of frames that the two systems are out of synchronization) have been sent to the system that is behind (processing block 1144). Normal game execution can then resume in processing block 1146. Error recovery processing logic then terminates through the exit bubble illustrated in FIG. 12.

Referring again to FIG. 1, processing path 1124 is taken is taken if the operation of establishing synchronization with the remote system is unsuccessful. In this case, the synchronization retry counter is decremented in processing block 1128. If all retry attempts have been used, processing path 1134 is taken where an error is indicated in processing block 1136 and error recovery processing logic terminates through the bubble labeled E illustrated in FIG. 12. If all retry attempts have not been used, processing path 1132 is taken to processing block 1120 where the processing logic for establishing synchronization between two game systems is again activated. This process continues until either the synchronization between the two systems is established or the number of retry counts has expired. Thus, the error recovery processing logic of the present invention is described.

Thus, a means and method for synchronizing the execution of multiple video game systems in a networked environment with no external synchronization signals required is disclosed. These specific arrangements and methods described herein are merely illustrative of the principles of this invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

We claim:

1. In a networked video game system, an apparatus for establishing and maintaining synchronization of a first and a second raster display, said apparatus comprising:

a first means for sending a first message from a first raster display to a second raster display along a communication medium;

a second means for sending a second message from said second raster display to said first raster display in response to said first message;

a third means for determining a latency between sending said first message and receiving said second message at said first raster display;

a fourth means for determining a skew between a refreshed cycle event in said first raster display and a refreshed cycle event in said second raster display; and a fifth means for activating an alternate display mode in said first raster display or said second raster display to maintain said latency between refresh cycle events within a predetermined limit.

2. In a network video game a method for synchronizing exchange of data between a first system and a second system comprising the steps of:

a) generating a first timing signal, wherein said first timing signal operates at an N multiple frame rate of said first system;

b) sending a first signal from said first system to said second system;

c) receiving a reply signal from said second system, wherein said reply signal comprises a first reference time, said first reference time indicating timing difference between reception of said first signal and a preceding refresh cycle of said second system;

d) calculating a first number of frames incremented in said first system when second system receives said first signal;

e) calculating a first time period between reception of said reply signal and processing of a current frame by said first system;

f) determining frames of latency based on a predetermined second time period, wherein said predetermined second time period comprises an allowable jitter range between said first time period and a subsequent refresh cycle;

g) aligning refresh cycle of said first system and refresh cycle of second system;

h) transmitting a begin signal from said first system to said second system, wherein said first system begins normal execution subsequent to said frames of latency of step (f); and i) beginning normal execution by said second system on a refresh cycle of said second system subsequent to reception of said begin signal.

3. The method of claim 2, wherein step (f) of determining frames of latency further comprises the steps of:

f1) comparing said first time period to said predetermined second time period;

f2) if said first time period is greater than said predetermined second time period adding a frame to said first number of frames; and f3) adding a frame to said first number of frames.

4. The method of claim 2, wherein step (h) of aligning refresh cycles further comprises the steps of:

h1) determining a skew, wherein said skew comprises the minimum between step (e) minus said first reference time or N minus step (E) minus said first reference time;

h2) transmitting a second signal from said first system to said second system, said second signal indicating whether said first system or said second system activates an alternate display mode to reduce said skew; and h3) activating an alternate display mode subsequent to a number of frames corresponding to magnitude of said skew.

5. The method of claim 2, wherein step (g) transmitting a begin signal further comprises the steps of:

g1) comparing said first time period to said predetermined second time period;

g2) if said first time period is greater than said predetermined second time period delaying transmission of said begin signal by half a frame.

6. In a network video game a method for maintaining synchronization between a first system and a second system comprising the steps of:

a) sending a first signal from said first system to said second system at a predetermined time;

b) sending a second signal from said second system to said first system at said predetermined time;

c) comparing time of receipt of both said first signal and said second signal versus a predetermined second time period, wherein said predetermined second time period comprises an allowable jitter range between reception of a signal and a subsequent refresh cycle; and d) aligning refresh cycle of said first system and refresh cycle of second system if time of receipt of either said first signal or said second signal is greater than said predetermined second time period.

7. The method of claim 6, wherein step (d) aligning refresh cycles further comprises the steps of:

d1) determining whether said first system, said second system or both said first system and said second system activates an alternate display mode to reduce said skew; and d2) activating an alternate display mode subsequent to a number of frames corresponding to magnitude of said skew.

8. An apparatus for synchronizing communication between a first system and a remote second system, said apparatus comprising:

a first device coupled to said first system, said first device configured to transmit and receive data across a communication medium;

a second device coupled to said first device, wherein said second device compares received data to an expected arrival time to determine a skew;

a third device for slewing a display of a system to reduce said skew;

a fourth device coupled to said second device, wherein said third device determines format of said data, wherein said data comprises data or a no data indication, said third circuit passing only data to a first FIFO staging buffer; and a fifth device coupled to said FIFO and a system controller, wherein said fifth device further comprises:
a first circuit to transmit a system controller signal or a no data message via said first device;

a second FIFO staging buffer, said second FIFO staging buffer including control signals from a control of said first system; and a third circuit to read the oldest data from said first FIFO and said second FIFO, wherein said second circuit pass read data to said first system.

* * * * *